United States Patent [19]
Faivre et al.

[11] Patent Number: 5,282,389
[45] Date of Patent: Feb. 1, 1994

[54] APPARATUS FOR MEASURING AGRICULTURAL YIELD

[75] Inventors: Stephen M. Faivre, DeKalb; David W. Larson, Maple Park; James H. Bassett, Sycamore, all of Ill.

[73] Assignee: Dawn Equipment Company, Sycamore, Ill.

[21] Appl. No.: 945,958

[22] Filed: Sep. 16, 1992

[51] Int. Cl.⁵ .............................. G01F 1/30
[52] U.S. Cl. .................. 73/861.73; 73/861.74; 460/1; 56/DIG. 2
[58] Field of Search .......... 73/861.71, 861.73, 861.74, 73/861.75, 861.72; 460/1, 4, 150

[56] References Cited

U.S. PATENT DOCUMENTS

| | | |
|---|---|---|
| 2,561,763 | 7/1951 | Waters et al. |
| 2,805,574 | 9/1957 | Jackson, Jr. et al. |
| 3,593,720 | 9/1971 | Botterill et al. |
| 3,606,745 | 9/1971 | Girodat |
| 3,774,446 | 11/1973 | Diehl |
| 3,939,846 | 2/1976 | Drozhzhin et al. |
| 3,945,532 | 3/1976 | Marks |
| 4,122,715 | 10/1978 | Yokoyama et al. |
| 4,157,661 | 6/1979 | Schindel |
| 4,481,830 | 11/1984 | Smith et al. |
| 4,604,906 | 8/1986 | Scarpa |
| 4,630,773 | 12/1986 | Ortlip |
| 4,765,190 | 8/1988 | Strubbe |
| 4,768,387 | 9/1988 | Kemp et al. |
| 5,015,997 | 5/1991 | Strubbe |
| 5,065,632 | 11/1991 | Reuter .............................. 73/861.73 |

OTHER PUBLICATIONS

Sensor Technologies and Control Strageties For Managing Variability—Steven C. Borgelt—Univ. of Missouri Apr. 1992.
New 4435 Hydro Row-Crop and Small-Grain Combine—John Deere.
Flow & Acreage Continuous Tracking System Monitor—Hiniker Co.
Moisture Trac 3000—Shivvers.
Combine Yield Monitor "You Bet Your Bushels!!-"—Acu-Grain.
A Farm Journal Publication—Top Producer—Nov., 1991.
Continuous Wheat Yield Measurement On A Combine—R. Vansichen J. De Baerdemaeker.

Primary Examiner—Richard E. Chilcot, Jr.
Assistant Examiner—Harshad Patel
Attorney, Agent, or Firm—Wood, Phillips, VanSanten, Hoffman & Ertel

[57] ABSTRACT

An improvement in an apparatus for processing an agricultural crop, which processing apparatus has structure for separating waste from a crop to provide a clean yield product and an elevator for raising and delivering clean yield product to a point of use such as a bin, or the like. The improvement is a structure including an actuating arm for producing a signal indicative of a pressure being applied to the actuating arm. The signal producing structure is mounted to the crop processing apparatus so that the actuating arm intercepts clean yield product discharging from the elevator. This pressure value can be correlated with other data, i.e. combine width, elevator speed, forward speed of the crop processing apparatus, material density (lbs/bundle) to generate a flow rate value that can be continuously plotted to generate a yield map for a field.

43 Claims, 5 Drawing Sheets

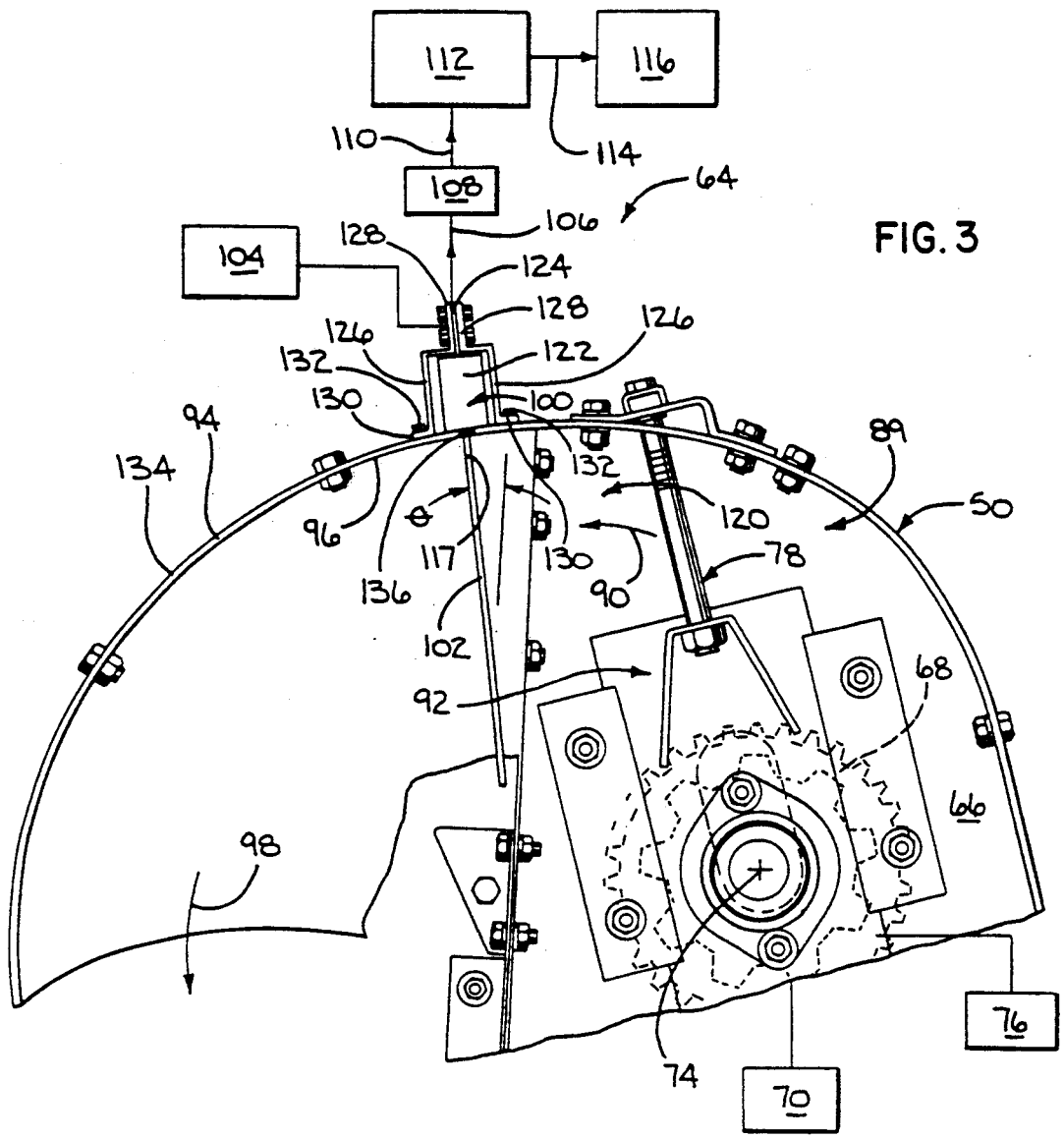
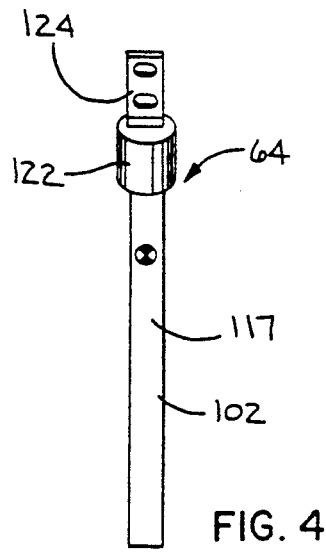
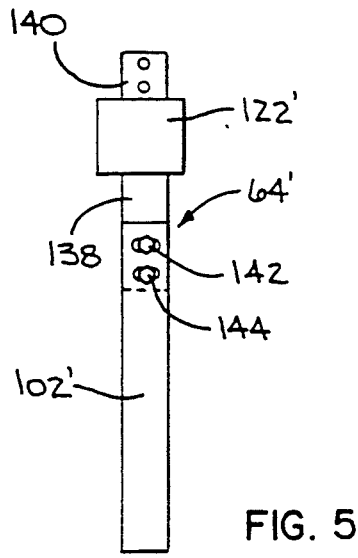
FIG. 3
FIG. 4
FIG. 5

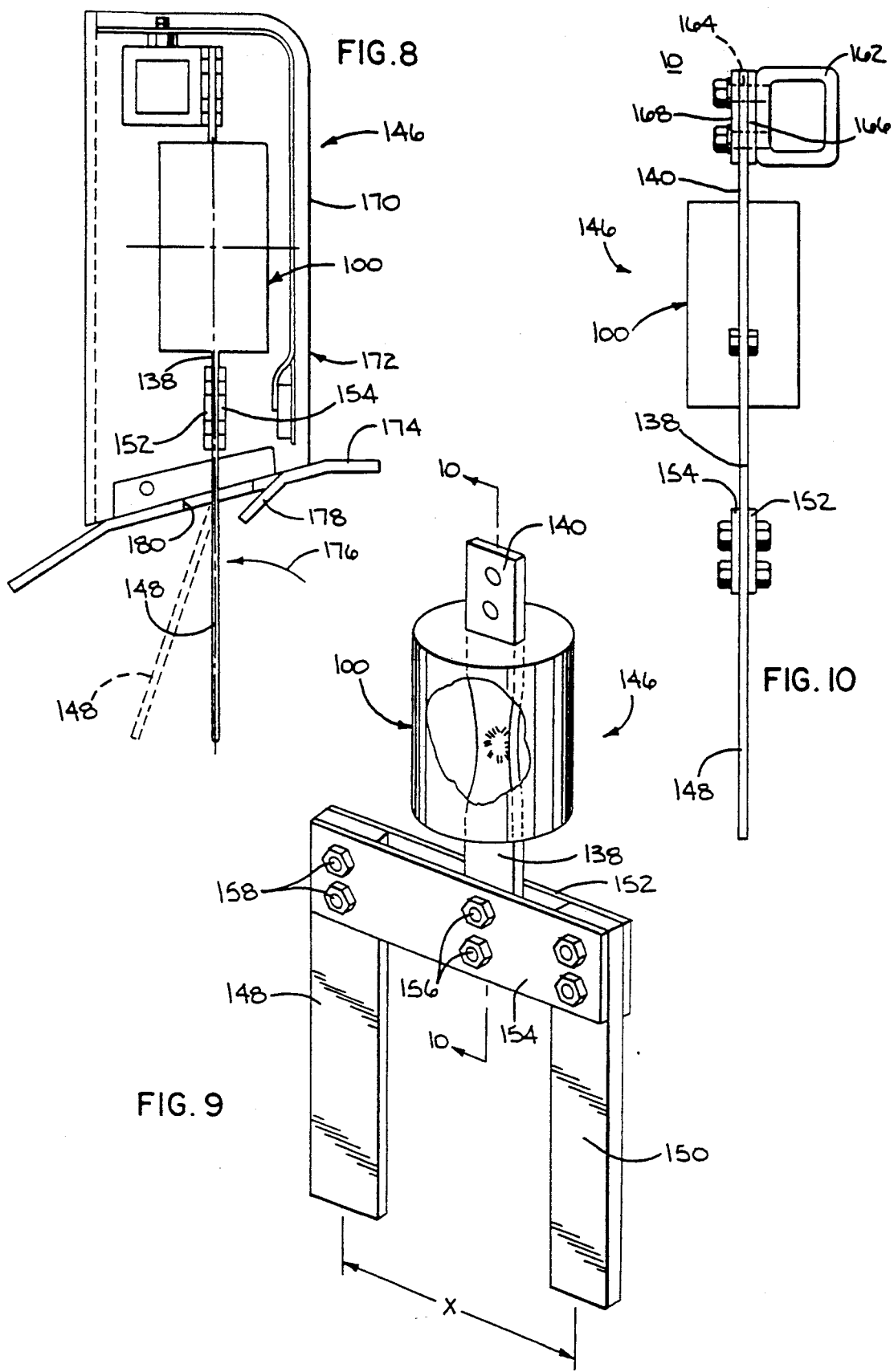

APPARATUS FOR MEASURING AGRICULTURAL YIELD

BACKGROUND OF THE INVENTION

1. Field of the Invention

This invention relates to agricultural equipment, such as a combine, for harvesting and threshing a crop, and, more particularly, to an apparatus for use on a combine to continuously monitor clean crop yield as the combine traverses a mature field, as to assist in the generation of a digitized field yield map.

2. Background Art

Fields in which crops are planted rarely have a homogeneous soil composition. Different soil types have a different ability to retain water, nutrients, pesticides, herbicides, etc. Consequently, if uniform application of fertilizers, pesticides, herbicides, and water is carried out, there will be a varied crop yield throughout a given field. This problem induced the development of customized soil and crop treatment, which has been a very high priority research area in the agricultural industry over the last decade.

Early attempts at customizing soil and crop treatment involved manual plotting of the field, monitoring of soil type and condition, and yield monitoring. Of late, field mapping has become substantially more sophisticated. Computer assisted mapping techniques, together with satellite tracking, are commonly used. Crop yield can now be very precisely mapped. In subsequent growing seasons, this yield information can be utilized to custom treat virtually all portions of a field to maximize overall yield. This concept is explained more fully in U.S. Pat. No. 4,630,773, to Ortlip, assigned to Soil Teq., Inc.

While yield maximization has been prompted in good part by economic considerations, environmental concerns regarding chemical application have made even more acute the need for effective field mapping. Further, government regulations have necessitated changes in and/or modifications to certain farming techniques. Still further, the mere shortage of fertile fields in certain geographic areas has dictated the need for maximizing crop yield.

A critical aspect of field mapping is the accurate monitoring of the crop yield. Heretofore, a wide range of different techniques has been developed to monitor crop yields.

One such system employs a gamma ray emitter and detector. Conveying grain passes between the emitter and the detector through a measuring gap. The grain blocks the rays to the detector. The number of rays reaching the detector is translated into a flow volume amount, which can be used to generate a yield map. The principal problem with this system is that there are strict controls placed on gamma ray emission in the United States. Depending upon the construction of the system, it may be illegal for use in the United States. A system, in accordance with the above, is currently being sold by Dronningborg Maskinfabrik A/S, in Germany.

Another yield sensor is currently available through Acu-Grain in Great Falls, Mont. Acu-Grain's system employs a pivotable flap at the output end of an unloading auger. The degree of pivoting of the flap determines the flow volume, which can then be correlated with other data to generate a yield map. This system, as all systems utilizing moving parts, is prone to failure. In normal harvesting and threshing operations, severe conditions are encountered. Dirt, dust, moisture and chemicals all contribute to premature equipment failure. In addition to the problem of corrosion from chemicals and moisture, buildup of dirt, particularly in damp environments, can effectively reconfigure parts and potentially block the range of movement of parts and, in the case of Acu-Grain's system, the pivoting flap. A buildup in material, on the face of the flap on which the discharging crop impinges, results in an increased pivoting movement for the flap for a given flow volume. This results in a false reading of a larger than actual flow volume. If this buildup is progressive, no compensation can be made and the information generated through the flap monitoring may be meaningless.

Another currently available system was jointly developed by Ford-New Holland, in Belgium, and the Agricultural Engineering Department of the Katholieke Universiteit Leuven. This system utilizes a curved plate which intercepts grain discharging from a clean grain elevator. The grain impacting the curved plate causes deflection thereof, which deflection is sensed and used to determine the flow volume by converting the plate displacement to a flow volume number. The frictional forces between the grain and plate are also worked into the flow volume calculation. The drawbacks with systems utilizing moving parts are present in this system as well.

Another system has been devised by Claydon Yieldometer, Ltd. in Suffolk, England. Claydon's system employs a catch bin to collect discharging grain. The bin is repeatedly filled and dumped. The interval between filling is used to determine the flow volume. Accumulation of grain, or other material within the bin, results in a reduction of the capacity of the bin, which results in inaccurate flow volume measurements. The problems associated with moving parts are also present in the Claydon structure. Still further, retrofitting of the Claydon structure to conventional combines is very expensive to accomplish.

Another system currently under development at Kansas State University uses an auxiliary discharge auger, which is added to a conventional combine. The auger is pivoted and filled at its proximal end. The distal end of the auger is suspended by a load cell. The load cell will detect a difference in the flow volume by detecting a difference in weight at the distal/discharge end of the auger. Because a fairly large accessory must be added to the combine, there are space problems associated with this construction. Further, the aforementioned problems, associated with moving parts, exist.

Other systems are under development to sense the volume of grain in a combine bin. One such system uses an ultrasonic sensor to determine the depth of grain in the bin. Another such system uses sensors at different heights to alert the user to the changing volume of grain in the combine bin. Both systems' accuracy depends upon the combine's being on substantially level terrain.

A further system under development monitors current to a motor that drives a clean grain conveying system in the combine. Flow volume/rate is directly related to the current draw for the motor.

Another system employs a potentiometer to measure batch volume. The accumulation for a given area harvested is determined and a flow rate is calculated therefrom and continuously plotted. The problem with this type of system is that it is sensitive to a change in attitude of the combine.

John Deere currently has a system that determines the speed of the clean grain elevator and the volume of material on each paddle on the grain elevator through electric eyes positioned at the top and/or bottom of the clean grain elevator. The system uses this data to compute the yield. Buildup of material on the paddles may give false readings. Generally, the required accuracy is difficult to achieve with such a system.

Generally, the above systems do not afford an economically feasible yield measuring device that is both accurate and reliable, particularly under severe operating conditions as normally encountered in the farming environment. Another problem is that certain of the above systems operate effectively only with the combine on level ground. Significant inclination of the combine, as may occur on frequently encountered sloped or hilly terrain, may compromise the accuracy of such systems, or make the data generated thereby altogether meaningless. A still further problem with certain of the systems described above is that they may undesirably alter the normal conveyance of crop through and out of the combine.

Several of the above systems came to the attention of the applicants through various trade association meetings. To the knowledge of the inventors, some of these systems are still under development and do not constitute prior art. However, all systems have been discussed to show the recent flurry of activity in yield monitoring and the wide range of proposed solutions to the problems encountered in yield monitoring.

SUMMARY OF THE INVENTION

The present invention is directed to a structure for measuring flow pressure of conveying clean yield product and for converting this pressure data to a meaningful flow rate signal to generate a field yield map. The structure a) is generic in form and can be retrofit to existing agricultural equipment with minimal modification thereto, b) has excellent durability, even under adverse conditions encountered in the agricultural environment, c) is accurate on hilly and sloped terrain as well as on level terrain, d) is affordable and e) is unobtrusive so as not to adversely affect the operation of the agricultural equipment to which it is adapted.

One aspect of the invention is an improvement in an apparatus for processing an agricultural crop, which processing apparatus has structure for separating waste from a crop to provide a clean yield product and an elevator for raising and delivering clean yield product to a point of use such as a bin, or the like. The improvement is a structure including an actuating arm for producing a signal indicative of a pressure being applied to the actuating arm. The signal producing structure is mounted to the crop processing apparatus so that the actuating arm intercepts clean yield product discharging from the elevator. This pressure value can be correlated with other data, i.e. combine width, elevator speed, speed of the crop processing apparatus, etc., to generate a flow rate value that can be continuously plotted to generate a yield map for a field.

In one form of the invention, the signal producing structure is mounted so that the actuating arm is in a stationary position. The signal producing structure has a strain gauge to detect the pressure applied on the actuating arm by the conveying clean yield product.

The use of a strain measurement device obviates the need for moving parts. This avoids many of the shortcomings of the prior art which rely upon one or more moving parts and which may hang up or otherwise fail over time, particularly under the severe conditions encountered in the farming environment.

Another advantage of the inventive structure is that the accuracy thereof is the same regardless of whether the crop processing apparatus is level or inclined.

A still further advantage of the inventive structure is that it is not prone to variation in operation by reason of material buildup on the actuating arm. The structure performs substantially the same with or without a material buildup, as is inevitable, particularly when a moist crop is being processed.

In one form, the actuating arm has a width, taken transversely to the direction of flow of clean yield product that it intercepts, that is less than the total width of flow of clean yield product at the point of interception. In one form, the width of the actuating arm, taken transversely to the direction of flow of clean yield product which it intercepts, is less than one inch.

The actuating arm, which is preferably elongate, has a substantially uniform cross section taken transversely to its length along that portion of the actuating arm that intercepts the clean yield product. Resultingly, the clean yield product can flow freely past the actuating arm with only minimal disruption of flow. Consequently, the basic operation of the crop processing apparatus into which the invention is incorporated, is substantially unaltered.

In one form, the crop processing apparatus has a shroud with a curved guide surface for deflecting clean yield product discharged from the elevator in a downward direction. The signal producing structure is, in one form, mounted to the crop processing apparatus so that the actuating arm projects downwardly to intercept clean yield product discharging from the elevator. The signal producing structure may be mounted directly to the shroud.

In one form, the actuating arm projects in cantilever fashion downwardly from the curved guide surface defined by the shroud. The curved guide surface on the shroud has an inverted, U-shaped configuration with a downwardly facing base portion. The actuating arm projects downwardly from the base portion of the curved guide surface. In one form, the actuating arm is angled to project at least slightly towards the discharge end of the elevator.

In one form of the invention, the actuating arm is made from aluminum, to be lightweight, provide accurate strain measurements, and avoid corrosion upon encountering herbicides, pesticides, fertilizers, water, etc. To facilitate assembly of the actuating arm, interchange of different actuating arms, and replacement of the actuating arm, the signal producing structure may have a mounting base to which the actuating arm is releasably connected, as by one or more removable bolts.

The invention also contemplates the above structure in combination with a structure for receiving the signal from the signal producing structure and for giving an indication of the volume/flow rate of the clean yield product intercepted by the actuating arm.

In one form, the signal producing structure produces an analog signal and structure is provided to convert the analog signal to a pulsed voltage signal which can be received by conventional, commercially available flow meters to give a visual indication of flow rate to the user.

The invention also contemplates an apparatus for measuring the pressure of flow of clean yield product conveying in an agricultural crop processing machine, which measuring apparatus has a structure, including an actuating arm, for producing a signal indicative of a pressure being applied to the actuating arm, and structure for mounting the signal producing structure to an agricultural crop processing machine to situate the actuating arm to intercept only a portion of clean yield product being conveyed by a crop processing machine.

In one form, the arm is substantially rigid so as not to significantly flex upon encountering conveying clean yield product. The signal producing structure is mounted so that the actuating arm is in a substantially fixed position in operation.

In one form, the actuating arm is elongate and has a substantially rectangular cross section taken transversely to its length. The cross section has a longer and a shorter dimension, with the longer dimension preferably being less than one inch and the shorter dimension being preferably less than ⅜ of an inch.

The invention also contemplates the combination of a) an agricultural combine having structure for separating waste from a crop to provide a clean yield product and for conveying clean yield product from the waste separating structure in a path to a point of use, which may be a storage bin or an auxiliary conveyor system, and b) a structure for measuring the pressure of flow of clean yield product conveying in the path. The pressure measuring structure has an actuating arm to intercept clean yield product conveying in the path and for giving an indication of pressure applied by conveying clean yield product on the actuating arm.

The invention still further contemplates an apparatus for determining the flow volume of a flowable material, which apparatus has a substantially rigid first actuating arm mounted in the path of the flowable material, and structure responsive to a pressure being applied to the arm for producing a signal indicative a pressure being applied to the actuating arm.

The inventive concept has utility in virtually all types of environments in which the pressure/volume/mass of a flowable material is to be determined.

With the inventive structure associated with a crop harvesting device, it has, in one preferred form, two actuating arms to intercept conveying crop, and preferably, clean yield product. The first and second actuating arms are in spaced relationship, and preferably mounted to the crop harvesting device to be in laterally spaced relationship with respect to the device. With the crop harvesting device on level ground, both arms intercept conveying crop. As the crop harvesting device tips to its side, as a result of traversing uneven terrain, the majority of the conveying crop is intercepted by the actuating arm on that side to which the device is tipped. This two arm arrangement assures that the monitoring signal is not interrupted due to a change in attitude of the crop harvesting device.

In a preferred form, both the first and second actuating arms are elongate and are mounted so that the lengths of the arms are in substantially parallel alignment.

In one form, there is a first cross piece extending transversely to the length of the first and second actuating arms. The first and second actuating arms are each connected to the first cross piece. In a more preferred form, a second cross piece is provided and the actuating arms are captively held between the first and second cross pieces.

In one form, the signal producing structure has a support base that projects between the first and second cross pieces. The support base is preferably mounted to a rigid support on the crop harvesting device.

In one form, there is a first metal plate between the support base and rigid support. More preferably, a second metal plate is provided, with the support base being sandwiched between the first and second metal plates.

In one form, the first and second metal plates are made from stainless steel.

BRIEF DESCRIPTION OF THE DRAWINGS

FIG. 3 is an enlarged, fragmentary, elevation view of the upper portion of the clean yield product elevator and showing the inventive pressure measuring apparatus thereon;

FIG. 4 is a perspective view of an isolated portion of the pressure measuring apparatus according to the present invention;

FIG. 5 is a fragmentary elevation view of an isolated portion of a modified form of pressure measuring apparatus according to the present invention;

FIG. 8 is a side elevation view of a modified form of pressure measuring apparatus, according to the present invention, in place on a crop harvesting device at the upper portion of a clean yield product elevator thereon;

FIG. 9 is an isolated perspective view of the pressure measuring apparatus in FIG. 8;

FIG. 10 is a cross-sectional view of the pressure measuring apparatus taken along line 10—10 of FIG. 9 and shown operatively connected to a rigid support on a crop harvesting device

DETAILED DESCRIPTION OF THE DRAWINGS

Figure 1:
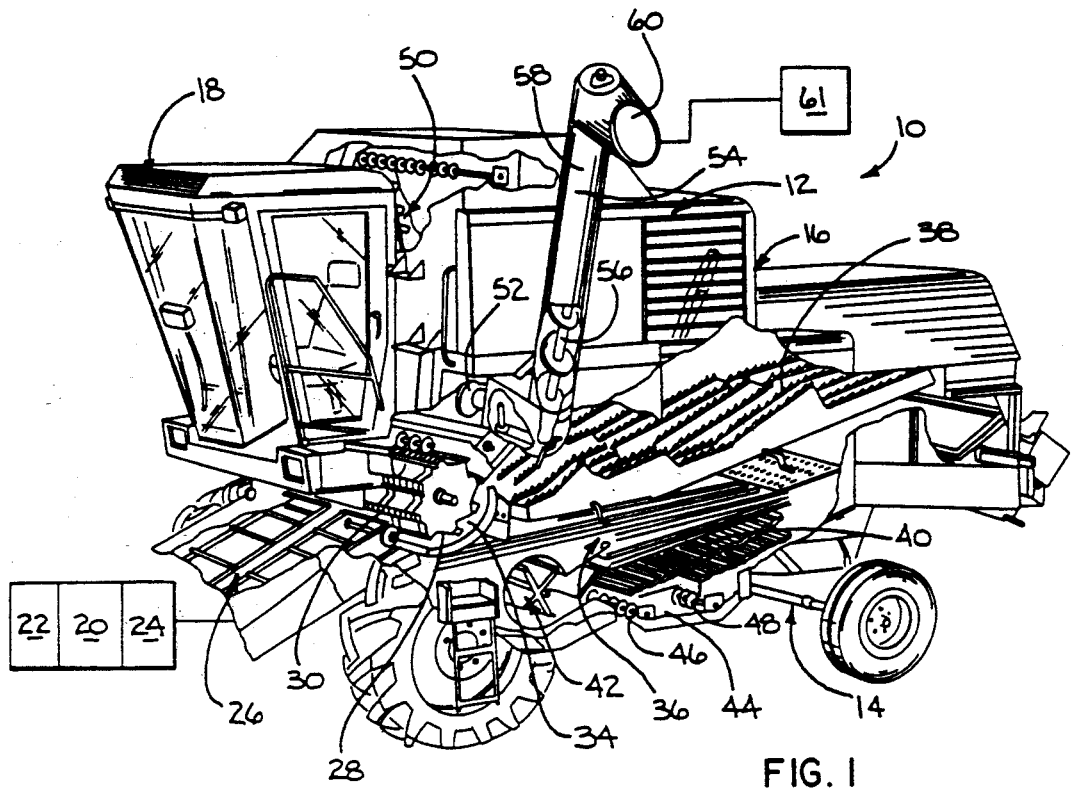
FIG. 1 is a perspective view of a conventional combine partially broken away to reveal the internal operating mechanism therefor, and incorporating an apparatus for measuring the pressure of flow of clean yield product conveying therein according to the present invention.
Figure 2:
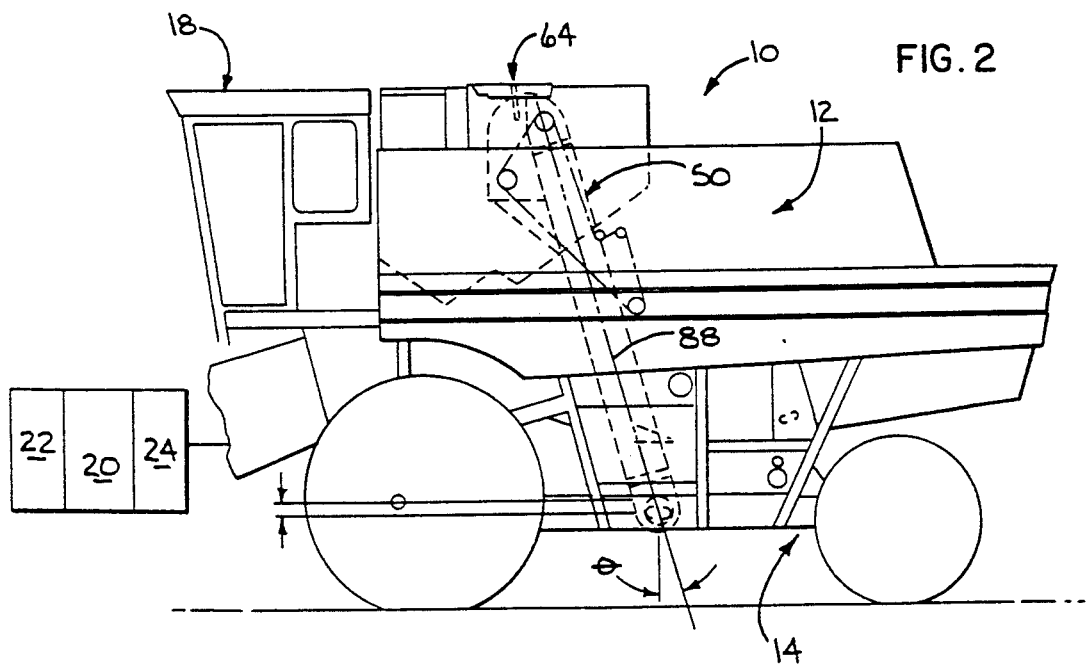
FIG. 2 is a side elevation view of the combine in FIG. 1 and showing in phantom lines the relationship between the inventive structure and a clean yield product elevator.
Figure 6:
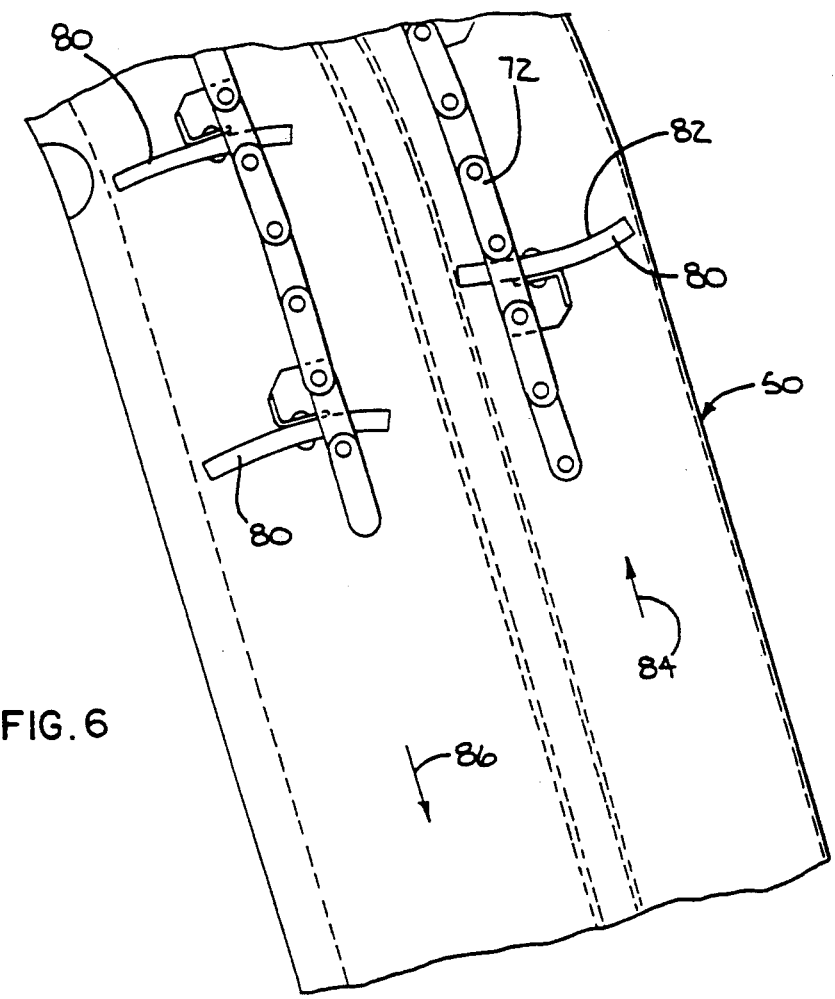
FIG. 6 is an enlarged, fragmentary, side elevation view of a portion of the clean yield product elevator.

In FIGS. 1 and 2, a conventional combine is shown at 10, only to be exemplary of one type of agricultural crop processing apparatus suitable for incorporation of the present invention. A brief discussion of the operation of the combine 10 appears below primarily to identify the environment for the invention.

The combine 10 has a harvesting and threshing mechanism 12 that is supported on a wheeled carriage 14. The mechanism 12 is operated, and the carriage 14 driven, through a power plant 16. An enclosed operator compartment 18 is provided at the front of the combine 10, and in the compartment 18 means are provided to control all functions of the combine 10. Whereas the combine 10 in FIGS. 1 and 2 is self-propelled, other combines may be towed, as by a tractor.

The combine 10 performs the multiple functions of cutting, threshing and cleaning a crop as it traverses a field. For purposes of explanation, the function of the combine 10 will be described with respect to wheat, although other types of crops may be similarly processed with the combine 10.

At the front of the combine 10, a cutter assembly 20, shown schematically, is provided. A revolving reel 22, shown schematically in FIGS. 1 and 2, pushes the grain stalks towards a cutting bar (not shown) on the cutter assembly 20, which severs the stalks. A rotary feed auger 24, shown schematically in FIGS. 1 and 2, conveys the cut stalks laterally inwardly for delivery to an endless conveyor system 26, which directs the grain stalks to a threshing cylinder 28.

The threshing cylinder 28 has circumferentially spaced threshing bars 30 which rub the wheat stalks against a concave 34 to thereby cause the grain, chaff, and short fragments of straw to be broken loose and delivered to a cleaning shoe 36. The straw is conveyed by the threshing cylinder 28 to a shaking screen 38 and passes therealong to the rear of the combine 10.

On the cleaning shoe 36, the grain is separated from the chaff and cleaned by filtering through a plurality of sieves 40, with a blower 42 providing a blast of air to propel the remaining chaff and straw fragments rearwardly away from the grain and out the back of the combine 10.

The clean grain accumulates in a bin 44 and is conveyed therethrough by laterally directed augers 46, 48 to a clean grain elevator 50, which raises the clean grain and delivers the same to a point of use, which may be a storage bin or directly into bags. In this case, the grain is delivered to a bin 52. A discharge assembly 54 has an internal auger 56 which picks up grain from the bin 52, elevates the grain in a vertical column 58 and discharges the same through a nozzle 60 as to a storage receptacle/vehicle, shown schematically at 61 in FIG. 1.

The present invention is directed to a structure for measuring the pressure of conveying clean yield product/grain to thereby produce a signal that can be processed with other data to produce a flow rate number that can be in turn utilized to generate a yield map for a field. Since the inventive structure, as shown at 64 in FIGS. 2-5, is associated with the clean yield elevator 50, the details of the elevator 50 will be described herebelow.

The clean yield elevator 50, as shown in FIGS. 1-6, has a frame 66 supporting vertically spaced sprockets 68, 70 (the latter shown schematically in FIG. 3). An endless, link chain 72 (FIG. 6) is trained around the sprockets 68, 70. The sprockets 68, 70 are rotatable about parallel axes 74 (one shown) to direct the chain 72 in an endless path. At least one of the sprockets 68, 70 is rotated by a drive mechanism 76, shown schematically in FIG. 3, to impart movement to the chain 72. A tensioning mechanism 78, connected to the sprocket 68, can be used to adjust the spacing between the sprockets 68, 70 to thereby alter the tension on the chain 72.

The chain 72 carries a plurality of rubber paddles 80, spaced equally along its length. The paddles 80 each have a concave surface 82 to pick up, from the bin 44, clean grain, or other clean yield product, and advance the same in the direction of movement of the chain 72, as indicated by arrows 84, 86 in FIG. 6. The chain 72 is driven at approximately 450-500 rpm by the drive mechanism 76.

The line 88 intersecting the axes 74 of the sprockets 68, 70 is inclined from the vertical by an angle →, which is normally on the order of 15°. Resultingly, the clean yield carried by the paddles 80 separates from the paddles 80 at the upper region 89 of the elevator 50 and is propelled by centrifugal forces forwardly and upwardly in the direction of arrow 90 at the discharge end 92 of the elevator 50. The top of the elevator 50 is bounded by a shroud 94 having an inverted, U-shape deflecting surface 96 that intercepts discharging grain and diverts the same downwardly in the direction of arrow 98.

The inventive structure 64 is mounted to the shroud 94. More particularly, the inventive structure 64 has a load cell 100 which acts as a differential bending beam. The structure 64 produces an output signal that is representative of a stress difference between two points on an actuating arm 102 projecting downwardly into the flow of clean yield discharging from the elevator 50, which stress difference is induced by pressure from the conveying clean yield product.

The operation of the structure 64 does not depend on the length of the actuating arm 102, which thus avoids error introduction when using different actuating arms 102. Similarly, crop buildup, as inevitably occurs when harvesting corn and soy beans, particularly in damp environments, does not affect operation of the inventive structure 64.

The load cell 100 is excited by 10 to 25 volts from a power source 104. The load cell 100 generates a signal with a frequency that is proportional to the load applied to the actuating arm 102 by the conveying yield from the elevator 50. An analog signal 106 is generated by the load cell 100 and is received by an amplifier board 108 which converts the analog signal to a pulsed voltage signal 110. A suitable amplifier board is trade by Tri-Onics Inc. of Highland, Ill. The load cell 100 and amplifier board 108 can be incorporated into a single unit to avoid any antenna effect.

The pulsed voltage signal 110 can be delivered to an off-the-shelf, commercially available liquid flow meter 112 to be converted thereby to a meaningful flow rate value. Suitable flow meters are commonly used to deliver metered amounts of liquid fertilizer to a field. One exemplary system is manufactured by Hinicker Company in Mankato, Minn. and identified by its trademark "Computer Facts" TM. By simply plugging the amplifier board/converter 108 into the flow meter port on the Hinicker Company device and effecting an appropriate conversion i.e. from gallons to bushels, a flow rate value can be continuously generated. This flow rate signal 114 can in turn be processed by a computer 116 to plot the yield flow rate for a complete field. The computer 116 can also be programmed to process signals from the global positioning system to precisely monitor the navigation of the combine 10.

The equipment can be calibrated to produce continuous flow rate data generated at prescribed time intervals or after travelling prescribed distances i.e. every 3 seconds or 20 feet. The calculation takes into account the speed of the combine (area traversed), the width of the combine 10 and speed of operation of the elevator 50. Adjustments can be made for moisture content and the pitch of the combine. Data related to pitch can be generated by a conventional pitch gauge (not shown) in the combine. The speed of the elevator 50 can be readily determined through commercially available sensors (not shown), connected to the shafts carrying the sprockets 68, 70. Some equipment has moisture sensors to generate the required data. One such meter is sold by Shivvers Company in Corydon, Ind. as its Model 3000.

The actuating arm 102 is part of a load bar 117 that has an overall elongate configuration. The actuating arm 102 projects into the space 120 bounded by the shroud 94 and has a substantially uniform, rectangular cross section taken transversely to its length. The longer cross-sectional dimension is less than 1 inch and preferably 0.75 inches. The shorter cross-sectional dimension is less than ⅜ of an inch and more preferably ¼ of an inch. The total width of the clean yield flow pattern, which the actuating arm 102 intercepts, is on the order of 7 to 9 inches. Consequently, the longer dimension of the actuating arm 102, which intercepts the flow, does not significantly disturb the flow pattern of the discharging clean yield product at the discharge end 92 of the elevator 50. At the same time, by intercepting only a small portion of the discharging clean yield product, little stress is applied to the actuating arm 102 or to any portion of the load bar 117 and the related components.

Preferably, the actuating arm 102 is made from a wear and corrosion resistant material such as metal and, more particularly, from aluminum or stainless steel. One preferred type of aluminum is 2024-T351 aluminum. Another preferred material is 316 stainless steel. The actuating arm 102 is thus virtually indestructible in operation.

A PVC "can" 122 houses certain electronic components for the load cell 100. Within the "can" 122, the load bar 117 is slightly necked down over approximately 2¼ inches of its length. In one form, the necked-down portion of the load bar 117 is on the order of 2.8×3/4 inches. This raises the stress level for the load bar 117 to give a greater output signal.

Within the "can" 122, there is a four arm Wheatstone bridge wired to measure differential strain across a two inch span. A resistor compensates for changes in span output due to modulus of elasticity changes. A 38 gauge magnetic wire compensates for zero shift due to temperature. One suitable strain gauge is made by the Micromeasurement Company and identified as its part No. J2A-06-5087Q-350.

The portion 124 of the load bar 117 that projects upwardly from the actuating arm 102 and through the "can" 122 provides a means for mounting the actuating arm 102 in its operative position. Two cooperating and identical brackets 126 bound the can "122" and have integral legs 128 between which the load bar portion 124 is captively bolted. The brackets 126 have offset flanges 130 which are secured as by bolts 132 to the upper surface 134 of the shroud 94. The load bar 117 projects through an opening 136 in the shroud 94. The opening 136 is larger than the cross section of the load bar 117 so that the actuating arm 102 does not contact the shroud 94 in use.

The preferred orientation for the actuating arm 102 is shown in FIG. 3. The actuating arm 102 projects downwardly in cantilever fashion from the shroud 94 and is angled slightly towards the discharge end 92 of the elevator 50. An angle Θ of approximately 10° is defined between a vertical line and the line of the length of the actuating arm 102.

The load bar 117, and actuating arm 102 defined thereby, are substantially rigid. Because the actuating arm 102 remains stationary, there are effectively no moving parts in the inventive structure 64. Consequently, the structure 64 is not prone to failure.

To increase the versatility of the inventive structure, a modified form thereof is shown at 64' in FIG. 5. In FIG. 5, an actuating arm 102' is shown which is releasably connected to a support base 138 that projects through a "can" 122' to upwardly thereof to define an exposed portion 140 to facilitate mounting by the brackets 126, as in the previously described embodiment. Bolts 142, 144 are used to releasably secure the actuating arm 102' to the support base 138, which has a projecting length preferably on the order of 1.25 inches. Thus, repair and replacement of the actuating arm 102 can be simply carried out.

A modified form of structure for measuring the pressure of conveying flowable material, according to the present invention, is shown at 146 in FIGS. 8-11. The pressure measuring structure 146 has the load cell 100 thereon with the exposed mounting portion 140 and support base 138, as previously described. Two actuating arms 148, 150 are substituted for the single arm 102, described above. The arms 148, 150 are connected to the support base 138 by first and second cross pieces 152, 154. The cross pieces 152, 154 are placed on opposite sides of the support base 138 and connected thereto as by bolts 156. The support base 138 connects to the cross pieces 152, 154 approximately midway between the ends of the cross pieces 152, 154.

The actuating arm 148 is captively held between the cross pieces 152, 154 at one end thereof and secured by bolts 158. A similar connection is made between the other end of the cross pieces 152, 154 and the actuating arm 150. The actuating arms 148, 150 project in cantilever fashion from the cross pieces 152, 154 and extend substantially parallel to each other. The spacing between the centers of the actuating arms 148, 150, designated by the reference letter "X", is 4½ inches in a preferred form.

One of the objectives of the two actuating arm arrangement of FIGS. 8-11 is to assure that the flow of material is at all times intercepted by the pressure measuring structure 146 regardless of the orientation of the device on which the structure 146 is mounted. To this end, in a farming application, the structure 146 is mounted so that the actuating arms 148, 150 are spaced laterally with respect to a crop harvesting device/combine 10 on which the structure 146 is mounted. If the combine 10 tips to one side, the crop flow is principally intercepted by the actuating arm 148. Opposite tipping results in the flow being intercepted principally by the other actuating arm 150.

In a preferred form, the actuating arms 148, 150 are made from the same material and with the same dimensions as the actuating arm 102, previously described. The actuating arms 148, 150 are made of either aluminum and more preferably from 316 stainless steel.

The structure 146 is mounted to a rigid support 162 on the combine 10. The support 162 is a square, hollow beam. The exposed portion 140 of the load cell 100 is secured to the rigid beam 162 by bolts 164. A first metal plate 166, made preferably from stainless steel, is interposed between the exposed load cell portion 140 and the beam 162. A second plate 168, also preferably made from stainless steel, is placed on the other side of the exposed portion 140 of the load cell 100. The exposed load cell portion 140 is sandwiched between the plates 166, 168 and connected to the beam 162. The metal plates 166, 168 provide a "clean" bending point to improve the quality of the signal generated by the load cell 100. Preferably, the plates have a dimension on the order of 1¼ inches by 1¼ inch, with a thickness of less than ⅛ of an inch.

The structure 146 is incorporated into a housing 170 to define a subassembly 172 that can be attached to a variety of different makes and styles of combine. The subassembly 172 is made universal in nature. The subassembly 172 is configured to cooperate with a mounting bracket 174 that can be custom fit to individual makes and styles of combines.

In FIG. 8, the grain flow in the combine elevator is in the direction of arrow 176. It has been found that the structure 146 works most effectively with the actuating arms 148, 150 inclined from the vertical, as shown in phantom in FIG. 8.

The mounting bracket 174 has an integral deflecting tab 178 to deflect the conveying crop towards the actuating arms 148, 150 and away from an opening 180 in the mounting bracket 174 that accommodates the arms 148, 150.

Figure 12:
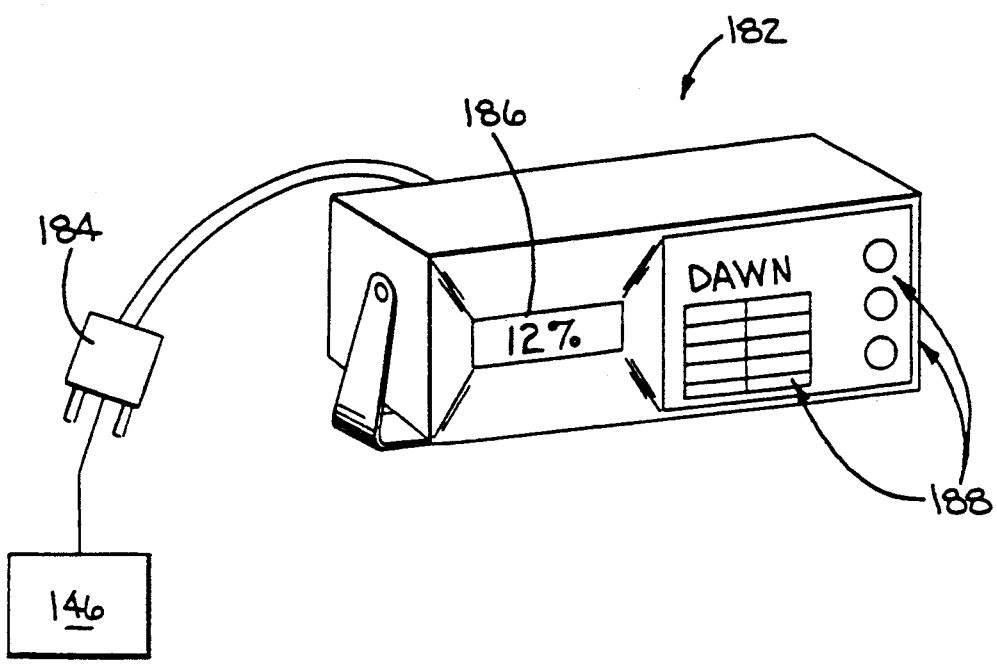
FIG. 12 is a perspective view of a structure produced by the assignee of the present invention to convert a signal produced by the pressure measuring apparatus according to the present invention, to give a visual indication of a detected flow rate for clean yield product.
Figure 11:
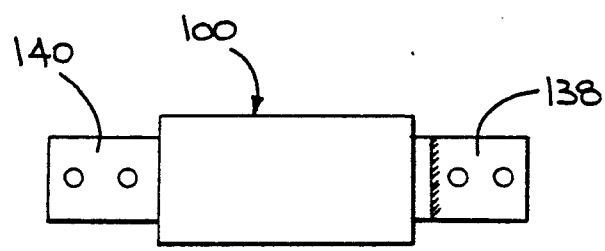
FIG. 11 is a front elevation view of a signal generating portion of the pressure measuring apparatus of FIGS. 8-10.

In FIG. 12, a commercially available meter is shown at 182. The meter 182 is currently manufactured by Dawn Equipment Company, 1210 E. State St., Sycamore, Ill. and sold under the trademark HARVESTYIELD TM. The meter 182 has a fitting 184 to establish electrical connection with the pressure measuring structure 146 to allow receipt of a signal generated thereby. The meter 182 includes a processor that converts the signal into a meaningful yield value that is displayed on a screen 186. Various controls 188 are used to calibrate the meter, taking into account variables such as combine width, speed, etc.

Figure 7:
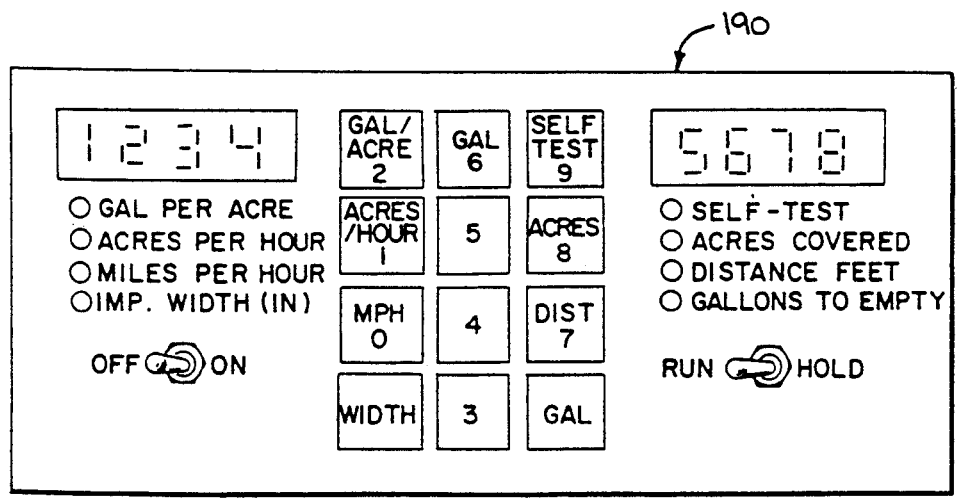
FIG. 7 is a front elevation view of a conventional liquid flow meter which can be connected to the pressure measuring apparatus of the present invention to convert a signal therefrom to give a visual indication of a detected flow rate for clean yield product.

Alternatively, the inventive structure 64, 146 can be simply retrofit to existing equipment. In conventional equipment such as combines made by John Deere, ready access can be gained to the top of the elevator 50 to effect mounting. Not only can the structure 64 be easily incorporated into a combine, but it can also be operatively connected to flow measuring equipment that is commercially available. For example, the output signal 110 from the converter 108 can be supplied to a liquid flow metering structure such as that made by Hinicker Company of Mankato, Minn. By simply connecting the output from the converter 108 to the liquid flow metering port of the Hinicker device, and utilizing a simple conversion chip, the data normally supplied to the flow metering structure i.e. ground speed and width, together with the flow signal from the load cell 100, can be processed and converted to generate a flow rate value which can be visually indicated on an LED display. The display portion of a commercially available Hinicker flow meter is shown at 190 in FIG. 7. Such flow meters are commonly mounted in the operator's compartment 18 of the combine 10, as shown in FIG. 1. Thus, the user need not purchase a meter to operate the present invention, thus saving the user a substantial sum of money.

The foregoing disclosure of specific embodiments is intended to be illustrative of the broad concepts comprehended by the invention.

We claim:

1. In an apparatus for processing an agricultural crop, said apparatus having means for separating waste from a crop to provide a clean yield product and elevator means for raising and discharging a clean yield product to a point of use, the improvement comprising:
    means including an actuating arm for producing a signal indicative of a pressure being applied to the actuating arm; and
    means for mounting the signal producing means to the apparatus so that the actuating arm intercepts clean yield product discharging from the elevator means,
    said actuating arm having a dimension which is significantly less than the dimension of the elevator means.

2. The improved apparatus for processing an agricultural crop according to claim 1 wherein the mounting means mounts the signal producing means so that the actuating arm is at all times in a substantially stationary position.

3. The improved apparatus for processing an agricultural crop according to claim 2 wherein the signal producing means includes a strain gauge.

4. The improved apparatus for processing an agricultural crop according to claim 1 wherein the actuating arm has a width, taken transversely to the direction of flow of clean yield product that the actuating arm intercepts, that is less than the total width of flow of clean yield product that it intercepts.

5. The improved apparatus for processing an agricultural crop according to claim 1 wherein the apparatus has a shroud with a curved guide surface for deflecting clean yield product discharged from the elevator means in a downward direction and there are means for mounting the signal producing means to the apparatus so that the actuating arm projects downwardly from the shroud to intercept clean yield product discharging from the elevator means.

6. The improved apparatus for processing an agricultural crop according to claim 5 wherein the mounting means mounts the signal producing means to the shroud.

7. The improved apparatus for processing an agricultural crop according to claim 5 wherein the actuating arm projects in cantilever fashion downwardly from the curved guide surface defined by the shroud.

8. The improved apparatus for processing an agricultural crop according to claim 5 wherein the curved guide surface on the shroud has an inverted U-shaped configuration with a downwardly facing base portion and the actuating arm projects downwardly from the base portion of the curved guide surface.

9. The improved apparatus for processing an agricultural crop according to claim 5 wherein the actuating arm comprises part of a substantially straight bar.

10. The improved apparatus for processing an agricultural crop according to claim 9 wherein the actuating arm is elongate and that portion of the actuating arm that intercepts clean yield product has a substantially uniform cross section taken transversely to the length of the actuating arm.

11. The improved apparatus for processing an agricultural crop according to claim 10 wherein the actuating arm has a width, taken transversely to the direction of flow of clean yield product which it intercepts, of less than 1 inch.

12. The improved apparatus for processing an agricultural crop according to claim 9 wherein the elevator means has a discharge end and the actuating arm is angled to project toward the discharge end of the elevator means.

13. The improved apparatus for processing an agricultural crop according to claim 1 wherein the actuating arm is made from one of stainless steel and aluminum.

14. The improved apparatus for processing an agricultural crop according to claim 1 in combination with a means for receiving a signal from the signal producing means and for giving an indication of the mass/volume of the clean yield product intercepted by the actuating arm.

15. The improved apparatus for processing an agricultural crop according to claim 14 wherein the signal producing means produces an analog signal and means are provided for converting the analog signal from the signal producing means to a pulsed voltage signal.

16. The improved apparatus for processing an agricultural crop according to claim 15 wherein the signal receiving means comprises means for producing a visual indication of the mass/volume of clean yield product intercepted by the actuating arm.

17. An apparatus for measuring the pressure of clean yield product conveyed by an agricultural crop processing machine through a flow path, said apparatus comprising:
   means including an actuating arm for producing a signal indicative of a pressure being applied to the actuating arm; and
   means for mounting the signal producing means to an agricultural crop processing machine to situate the actuating arm to intercept clean yield product being conveyed by an agricultural crop processing machine,
   whereby the actuating arm has a dimension that is substantially less than the dimension of the flow path as viewed in cross section taken transversely to the direction of flow of the clean yield product so that clean yield product flows against and past the actuating arm.

18. The improved apparatus for processing an agricultural crop according to claim 17 in combination with a means for receiving a signal from the signal producing means and giving an indication of the pressure exerted by conveying clean yield product on the actuating arm.

19. The improved apparatus for processing an agricultural crop according to claim 18 wherein the signal producing means comprises means for producing an analog signal and means are provided for converting the analog signal from the signal producing means to a pulsed voltage signal and the signal receiving means comprises means for receiving a pulsed voltage signal and in response thereto giving a visual indication of the flow rate of the conveying clean yield product.

20. The improved apparatus for processing an agricultural crop according to claim 17 wherein the actuating arm is substantially rigid so as not to significantly flex upon encountering conveying clean yield product.

21. The improved apparatus for processing an agricultural crop according to claim 20 wherein the mounting means mounts the signal producing means so that the actuating arm is in a substantially fixed position.

22. The improved apparatus for processing an agricultural crop according to claim 17 wherein the actuating arm is elongate and that portion of the actuating arm that intercepts conveying clean yield product has a substantially uniform cross section taken transversely to the length of the actuating arm.

23. The improved apparatus for processing an agricultural crop according to claim 22 wherein the portion of the actuating arm has a substantially rectangular configuration taken transversely to the length of the actuator arm, with there being a longer and a shorter dimension.

24. The improved apparatus for processing an agricultural crop according to claim 23 wherein the longer dimension of the portion of the actuating arm is less than 1 inch.

25. The improved apparatus for processing an agricultural crop according to claim 24 wherein the shorter dimension of the portion of the actuating arm is less than ⅛ inch.

26. The improved apparatus for processing an agricultural crop according to claim 17 wherein the signal producing means has a base and means are provided for removably connecting the actuating arm to the base of the signal producing means.

27. In combination:
   an agricultural combine having means for separating waste from a crop to provide a clean yield product and means for conveying clean yield product from the waste separating means through a path to a point of use; and
   means for measuring the pressure of flow of clean yield product conveying in said path, said pressure measuring means including an actuating arm, means for mounting the pressure measuring means to the combine so that the actuating arm intercepts clean yield product conveying in said path, and means for giving an indication of pressure applied by conveying clean yield product on the actuating arm to thereby determine the volume/mass of conveying clean yield product,
   whereby the actuating arm has a dimension that is substantially less than the dimension of the flow path taken transversely to the direction of flow of the clean yield product,
   whereby the actuating arm intercepts substantially less than the entire flow of clean yield product from the conveying means.

28. The combination according to claim 27 wherein the conveying means includes elevator means for raising clean yield product, said elevator means having a discharge end, said actuating arm intercepting clean yield product discharged by the elevator means at its discharge end.

29. The combination according to claim 27 wherein said pressure measuring means includes a strain gauge for determining pressure applied to the actuating arm by conveying clean yield product.

30. The combination according to claim 27 wherein the combine has a shroud with a curved guide surface for deflecting clean yield product discharged by the elevator means in a downward direction and the pressure measuring mounting means mounts the pressure measuring means to the combine so that the actuating arm projects downwardly to intercept clean yield product discharged by the elevator means.

31. The combination according to claim 27 wherein the means for giving an indication of pressure comprises means for producing a signal indicative of a pressure being applied to the actuating arm, there further being means for receiving the signal from the signal producing means to give an indication of a pressure being applied to the actuating arm by conveying clean yield product.

32. An apparatus for determining flow volume of clean yield product in an agricultural crop harvesting device, said apparatus comprising:

a substantially rigid first actuating arm;

means for mounting the first actuating arm to the combine so that the actuating arm intercepts clean yield product advanced through a path defined by the combine; and means responsive to a pressure being applied to the arm for providing a signal indicative of a pressure being applied by conveying clean yield product to the actuating arm, said actuating arm having a dimension that is substantially less than the dimension of the path of advancing clean yield product taken transversely to the direction of advancement of the clean yield product.

33. The apparatus according to claim 32 in combination with an agricultural crop harvesting device.

34. The combination according to claim 33 wherein there is a second actuating arm and means are provided for mounting the second actuating arm to the crop harvesting device in spaced relationship to the first actuating arm so that the second actuating arm intercepts clean yield product conveying in said path.

35. The combination according to claim 34 wherein the crop harvesting device has laterally spaced sides and the first and second actuating arms are spaced laterally from each other with respect to the crop harvesting device.

36. The combination according to claim 35 wherein the first and second actuating arms are elongate and the mounting means for the first and second actuating arms mount the first and second actuating arms in cantilever fashion with the lengths thereof substantially parallel to each other.

37. The combination according to claim 36 wherein the mounting means for the first and second actuating arms comprises a first cross piece extending transversely to the lengths of the first and second actuating arms and means for connecting each of the first and second actuating arms to the first cross piece.

38. The combination according to claim 37 wherein the mounting means for the first and second actuating arms includes a second cross piece and means for connecting the first and second actuating arms captively between the first and second cross pieces.

39. The combination according to claim 38 wherein the signal producing means includes a support base that projects to between said first and second cross pieces.

40. The combination according to claim 39 wherein the support base is part of the means for mounting the first and second actuating arms, there being a rigid support on said crop harvesting device and the means mounting the first and second actuating arms includes means for connecting the support base to the rigid support.

41. The combination according to claim 40 wherein there is a metal plate between the support base and rigid support.

42. The combination according to claim 41 wherein there is a second metal plate and the support base is sandwiched between the first and second metal plates.

43. The combination according to claim 42 wherein the first and second metal plates are made from stainless steel.

* * * * *